United States Patent
Kamata et al.

(10) Patent No.: US 10,600,199 B2
(45) Date of Patent: Mar. 24, 2020

(54) EXTENDING OBJECT DETECTION AND IDENTIFICATION CAPABILITY FOR AN OBJECT SENSOR DEVICE

(71) Applicant: Toyota Research Institute, Inc., Los Altos, CA (US)

(72) Inventors: Nobuhide Kamata, Ann Arbor, MI (US); Katsuhiro Sakai, Ann Arbor, MI (US); Michael R. James, Northville, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 137 days.

(21) Appl. No.: 15/634,673

(22) Filed: Jun. 27, 2017

(65) Prior Publication Data
US 2018/0374235 A1    Dec. 27, 2018

(51) Int. Cl.
*G06T 7/73*    (2017.01)
*G06K 9/00*    (2006.01)

(52) U.S. Cl.
CPC .......... *G06T 7/73* (2017.01); *G06K 9/00214* (2013.01); *G06K 9/00791* (2013.01); *G06K 9/00805* (2013.01); *G06T 2207/10028* (2013.01)

(58) Field of Classification Search
None
See application file for complete search history.

(56) References Cited

U.S. PATENT DOCUMENTS

| 7,860,299 | B2 * | 12/2010 | Chaperon | ............... G06T 17/30 345/419 |
| 8,849,494 | B1 | 9/2014 | Herbach et al. | |
| 9,052,721 | B1 * | 6/2015 | Dowdall | .............. G05D 1/0272 |

(Continued)

FOREIGN PATENT DOCUMENTS

| CN | 105513051 A | * | 4/2016 |
| CN | 106407947 A | * | 2/2017 |

(Continued)

OTHER PUBLICATIONS

Heap, A. J., "Learning Deformable Shape Models for Object Tracking", Thesis submitted to the University of Leeds School of Computer Studies, Sep. 1997 in 127 pages.

(Continued)

*Primary Examiner* — Jiangeng Sun
(74) *Attorney, Agent, or Firm* — Christopher G. Darrow; Darrow Mustafa PC (57) ABSTRACT

A device and method for extending an object identification range in a vehicle environment are disclosed. In this regard, the embodiments may operate to solve to a remaining one of a set of pre-defined shape models to an object by successive iterations of point cloud data and associated closing distance to the object. Successive iterations of point cloud data may include receiving, via an object sensor device, the point cloud data, and detecting at least a portion of an object from the point cloud data, which portion is compared with each of a set of pre-defined shape models. The set is updated to include ones comparing favorably with the point cloud data.

(Continued)

When the successive iterations solve to a singular remaining one of the set, an iterative match to the object may be based on the singular remaining one of the set of pre-defined shape models to identify the object.

20 Claims, 6 Drawing Sheets

(56) References Cited

U.S. PATENT DOCUMENTS

| | | | |
|---|---|---|---|
| 9,574,874 B2* | 2/2017 | Son | G01B 11/22 |
| 9,934,590 B1* | 4/2018 | Cheng | G06K 9/4642 |
| 2008/0215510 A1* | 9/2008 | Regli | G06F 15/18 |
| | | | 706/12 |
| 2016/0093101 A1* | 3/2016 | Benedek | G06K 9/00201 |
| | | | 345/420 |
| 2017/0053438 A1* | 2/2017 | Huang | G06T 17/20 |
| 2017/0193699 A1* | 7/2017 | Mehr | G06T 7/194 |
| 2017/0372527 A1* | 12/2017 | Murali | G06F 3/048 |
| 2018/0067487 A1* | 3/2018 | Xu | G05D 1/0088 |
| 2018/0122137 A1* | 5/2018 | Tian | G06T 7/521 |
| 2018/0144493 A1* | 5/2018 | Mulukutla | G06T 7/62 |
| 2018/0330149 A1* | 11/2018 | Uhlenbrock | G06K 9/00214 |

FOREIGN PATENT DOCUMENTS

| | | | | |
|---|---|---|---|---|
| CN | 107123164 A | * | 9/2017 | |
| CN | 109145969 A | * | 1/2019 | |
| JP | 6069489 B2 | * | 2/2017 | G06K 9/00214 |

OTHER PUBLICATIONS

Held, D. et al., "Combining 3D Shape, Color, and Motion for Robust Anytime Tracking", Robotics: science and systems, 2014 in 10 pages.

Huang, J. et al., "Point Cloud Matching based on 3D Self-Similarity", Computer Vision and Pattern Recognition Workshops (CVPRW), 2012 IEEE Computer Society Conference in 8 pages.

Kwak, K.H., "Approximate Representation of Unknown Objects with a Single-line Scanning Lidar and a Video Camera, Dissertations", Paper 108 (2012) in 126 pages.

Johnson, A.E. et al., "Using Spin-Images for Efficient Object Recognition in Cluttered 3D Scenes", IEEE Transactions on Pattern Analysis and Machine Intelligence, vol. 21, No. 5, May 1999. pp. 433-449.

* cited by examiner

FIG. 1

FIG. 2
vehicle control unit 110

EXTENDING OBJECT DETECTION AND IDENTIFICATION CAPABILITY FOR AN OBJECT SENSOR DEVICE

FIELD

The subject matter described herein relates in general to vehicle object sensing devices, and, more particularly, to the extending detection and identification distance capability of vehicle object-sensing devices with pre-defined shape models.

BACKGROUND

Object detection in a vehicle environment has generally sought to improve response times related to device perception systems. Improved response times have drawn attention with respect to autonomous vehicle operation to navigate vehicle roadways, as well as to driver-assist operations to detect and identify an object presence for cautionary alerting to a vehicle operator. However, the useful sensor range of device perception systems may be limited by a minimal return of sensor device sourcing signals. That is, the useful sensor range of a device has corresponded to sufficient returns of sensor device sourcing signals before being capable of discerning an object's presence in the source signal returns. Accordingly, a device and method are desired to extend a range for object detection in autonomous and/or driver-assist vehicle operation.

SUMMARY

A device and method for extending an object identification range in a vehicle environment from cloud point data are disclosed.

In one implementation, a method for extending an object identification range in a vehicle environment is disclosed. The method includes solving to a remaining one of a set of pre-defined shape models to an object by successive iterations of point cloud data and associated closing distance to the object by: receiving, via an object sensor device, the point cloud data. From the point cloud data, detecting at least a portion of the object from the point cloud data, and comparing each of a set of pre-defined shape models with the at least the portion of the object. The set of pre-defined shape models are updated to include ones comparing favorably with the point cloud data. When the successive iterations solve to a singular remaining one of the set of pre-defined shape models, identifying an iterative match to the object based on the singular remaining one of the set of pre-defined shape models.

In another implementation, a vehicle control unit for vehicular object identification in a vehicle environment is disclosed. The vehicle control unit includes a processor, and memory communicably coupled to the processor and to an object sensor device. The memory stores an object detection module and an object decision module. The object detection module includes instructions that, when executed by the processor, cause the processor to receive, via an object sensor device, point cloud data, and detect at least a portion of a vehicular object from the point cloud data. The object detection module instructions, when executed by the processor, cause the processor to produce detected vehicular object data from the at least the portion of the vehicular object from the point cloud data. The object decision module includes instructions that, when executed by the processor, cause the processor to compare each of a set of pre-defined shape models with the detected vehicular object data and update the set of pre-defined shape models to ones comparing favorably with the detected vehicular object data. When successive iterations of the object detection module and the object decision module on subsequent point cloud data solve to a remaining one of the set of pre-defined shape models, the object decision module, via instructions when executed by the processor, cause the processor to produce vehicular object classification data based on the remaining one of the set of pre-defined shape models.

BRIEF DESCRIPTION OF THE DRAWINGS

The description makes reference to the accompanying drawings wherein like reference numerals refer to like parts throughout the several views, and wherein.

4A and 4B illustrate an operational example of an object sensor device with respect to detecting at least a portion of an object.

DETAILED DESCRIPTION

Extending an object identification range of a vehicle control unit is described here. One example method may include determining an iterative match of one of a set of pre-defined shape models to an object by successive iterations of closing distances to the object. The iterations may include receiving, via an object sensor device, point cloud data relating to at least a portion of an object, comparing each of a set of pre-defined shape models with the point cloud data, and updating the set of pre-defined shape models to include ones comparing favorably with the point cloud data. When the successive iterations solve to a singular remaining one of the set of pre-defined shape models, identifying an iterative match to the object based on the singular remaining one of the set of pre-defined shape models. In this manner, the object detection range of a vehicle control unit may be extended by starting detection based on point cloud data return from at least a portion of the object. With an effective early start, successive matches are determined to each of a set of pre-defined object models upon closing the distance to the object.

Figure 1:
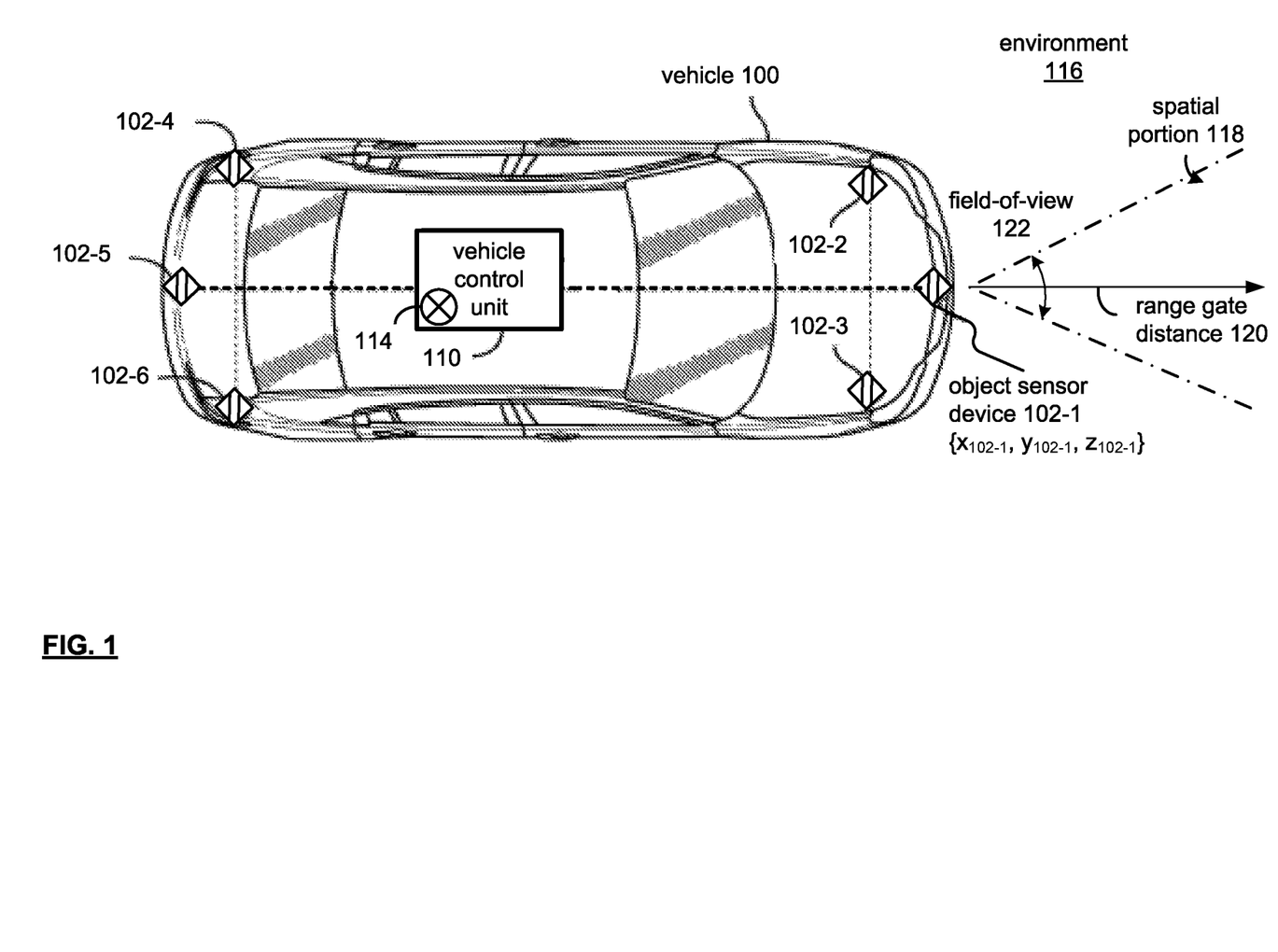
FIG. 1 is a schematic illustration of a vehicle including a vehicle control unit.

FIG. 1 is a schematic illustration of a vehicle 100 including a vehicle control unit 110. A plurality of object sensor devices 102-1, 102-2, 102-3, 102-4, 102-5 and 102-6 (generally, object sensor devices 102) are in communication with the control unit 110 to access a vehicle environment. As may be appreciated, the vehicle 100 may also be an automobile, light truck, cargo transport, or any other passenger or non-passenger vehicle.

The object sensor devices 102 may be positioned on the outer surface of the vehicle 100, or may be positioned in a concealed fashion for aesthetic purposes with regard to the vehicle. Moreover, the sensors may operate at frequencies in which the vehicle body or portions thereof appear transparent to the respective sensor device. Also, known location data relating to the object sensor devices 102 may be based on relative positions to a vehicle reference point 114 having, for example, a GPS location data of $\{X_{114}, Y_{114}, Z_{114}\}$, or relative location reference with respect to the object sensor devices 102. The vehicle reference point 114 may be coincident with a placement location of the vehicle control unit 110, or as may be appreciated, coincident with an object sensor device's location, or located elsewhere with the vehicle 100 as desired.

Each of the object sensor devices 102 may have an associated location, provided via location data, relative to the predetermined original location provided by the vehicle reference point 114. As may be appreciated, the location data may be stored in a memory of the sensor component, retrieved from a lookup table of the vehicle control unit 110 based on a vehicle network address. For the example of object sensor device 102-1, the relative coordinates may be presented as $X_{102-1}, Y_{102-1}, Z_{102-1}$, and similarly for other object sensor devices, in relation to the predetermined original location of reference point 114.

Communication between sensor devices and vehicle control units, including vehicle control unit 110, may be on a bus basis, and may also be used or operated by other systems of the vehicle 100. For example, the object sensor devices 102 may be coupled by a combination of network architectures such as a Body Electronic Area Network (BEAN), a Controller Area Network (CAN) bus configuration, an Audio Visual Communication-Local Area Network (AVC-LAN) configuration, and/or other combinations of additional communication-system architectures to provide communications between devices and systems of the vehicle 100.

Outputs of the example object sensor devices 102 may be used by the vehicle control unit 110 to detect objects in the travel path (or off the travel path) of the vehicle. As may be appreciated, an object identification range may be extended with respect to each of the object sensor devices 102, as is discussed in detail with reference to FIGS. 1-6.

The object sensor devices 102, by way of example, may provide tactile or relational changes of the environment 116 of the vehicle 100, such as an approaching pedestrian, cyclist, object, vehicle, road debris, and other such vehicle obstacles (or potential vehicle obstacles).

The object sensor devices 102 may be provided by a Light Detection and Ranging (LIDAR) object sensor device and/or array, in which the object sensor devices 102 may capture data related to laser light returns from physical objects in the environment of the vehicle 100. The sensory input devices 102 may also include a combination of LIDAR object sensor device(s), radar object sensor device(s), milliwave object sensor devices, etc. LIDAR, radar, and/or milliwave based object sensor devices may operate to sense objects along with a velocity (that is, relative and/or absolute velocities) of the objects.

The object sensor devices 102 may, alone or in combination, operate to capture depth images or otherwise generating depth information for a captured image. For example, the object sensor devices 102 may configured to capture images (visual and non-visual spectrum wavelengths, audible and non-audible wavelengths, etc.).

In this aspect, the object sensor devices 102 are operable to determine distance vector measurements of objects in spatial portions 118 of the vehicle environment 116. For example, each of the object sensor devices 102 may be configured to sense and/or analyze structured light, time of flight (e.g., of signals for Doppler sensing), light detection and ranging (LIDAR), light fields, and other information to determine depth/distance, direction and/or velocity of objects based on a field of view 122 with respect to an object sensor device 102. For example, a field-of-view 122 may include one-hundred-and-twenty degrees, both horizontally and vertically. An example minimum range may be ten centimeters, and a range (based on a device's range gate distance) may be at least one-hundred-fifty meters at eight-percent reflectivity that may produce a point cloud density relatable to at least a portion of the object.

Example object sensor devices 102, based on an object having higher reflectivity such as a vehicle, may realize a spatial portion 118 that may extend one-hundred twenty meter range for vehicles. An object sensor device 102 may receive one million points or more per second, which also may be referred to as a point cloud. An output of the point cloud may be in turn received by the vehicle control unit 110 via a vehicle network as discussed above, or via a direct coupling with the vehicle control unit 110.

In operation, objects such as terrain, foliage, pedestrians, etc., may be detected using multiples of the object sensor devices 102-1 through 102-6 in combination or independently. In one example, object sensor devices 102-1, 102-2, and 102-3 may operate to detect objects ahead of the vehicle 100, and object sensor devices 102-4, 102-5 and 102-6 may operate to detect objects behind the vehicle 100.

Also, each of the object sensor devices 102 may implement respective functions to provide a collective object parameter detection based on respective spatial portions 118. For example, object sensor device 102-1 may operate to detect an object, and object sensor device 102-2 may operate to detect an object velocity relative to the vehicle 100. Also, object sensor device 102-3 may operate in combination with object sensor device 102-1 to corroborate a sensing and/or detection of an object. As may be appreciated, an object's velocity may be determined via an object sensor device, may be extrapolated by successive position detection measurements of the object, and calculating speed and/or direction of motion based thereon (such as to form a motion vector).

As may be appreciated, respective sets of object sensor devices may operate in combination with other sets of object sensor devices, may operate in an alternately or asynchronously, simultaneously, or individually based upon a desired sensing function and/or application.

When one or more of the object sensor devices 102 may be a LIDAR sensor, point cloud segmentation may be applied to discern a vehicle from other objects. As may be appreciated, object sensor devices 102 may have a limited range for detecting objects. Generally, an outer limit of such a range may be disregarded as statistically insignificant because the minimal point cloud data producing a point cloud density relatable to at least a portion of the object may be realized at this juncture, which may be referred to as a range gate distance of each of the object sensor device 102-1 through 102-6, as is discussed in detail with reference to FIGS. 4A and 4B.

Object detection and recognition can include aspects of edge and shape detection and recognition, also incorporating other known aspects of object segmentation and recognition. When one or more of the sensors is a camera, computer vision techniques are used to detect vehicles. These techniques can include object recognition, including shape and edge detection. Both image recognition processes may be based on trained deep learning methodologies, and/or based on predefined data libraries that may include known and recognizable shape models and/or edge models of objects (e.g. vehicles, cyclists, etc.).

In operation, the vehicle control unit 110 may operate to begin object recognition at or near range gate distance 120 of the spatial portion 118. Generally, at a range gate distance of object sensor devices 102, object detection may be limited based on the sensor's specification, characteristics of an emitted signal, and/or association of an emitted pulse with a return pulse from an object and pulse rates. By beginning object recognition based on the point cloud data from a range gate distance 120, object recognition may resolve quicker, and object tracking may be based on a pre-defined shape model, as is discussed in detail with reference to FIGS. 2-6.

Figure 2:
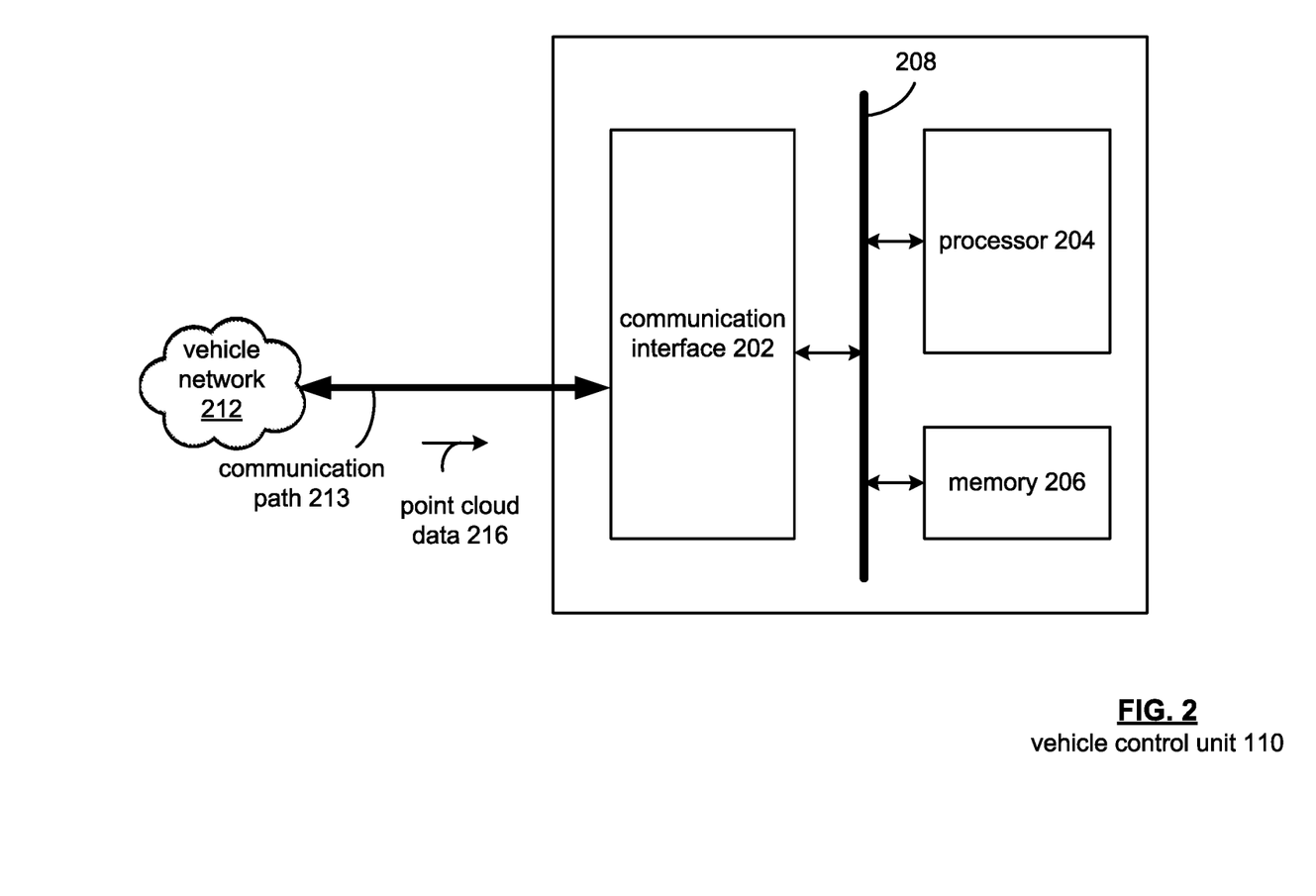
FIG. 2 is a block diagram of a vehicle control unit of FIG. 1.

FIG. 2 is a block diagram of a vehicle control unit 110, which includes a communication interface 202, a processor 204, and memory 206, that are communicably coupled via a bus 208. The vehicle control unit 110 may provide an example platform for the device and methods described in detail with reference to FIGS. 1-6.

The processor 204 can be a conventional central processing unit or any other type of device, or multiple devices, capable of manipulating or processing information. As may be appreciated, processor 204 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory (and/or memory element) 206 may be communicably coupled to the processor 204, and may operate to store one or more modules described herein. The modules can include instructions that, when executed, cause the processor 204 to implement one or more of the various processes and/or operations described herein.

The memory and/or memory element 206 may be a single memory device, a plurality of memory devices, and/or embedded circuitry of the processor 204. Such a memory device may be a read-only memory, random access memory, volatile memory, non-volatile memory, static memory, dynamic memory, flash memory, cache memory, and/or any device that stores digital information. Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium.

The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. In the context of this document, a computer-readable storage medium may be any tangible medium that can contain, or store a program for use by or in connection with an instruction execution system, apparatus, or device. Program code embodied on a computer-readable medium may be transmitted using any appropriate medium, including but not limited to wireless, wireline, optical fiber, cable, RF, etc., or any suitable combination of the foregoing.

The memory 206 is capable of storing machine readable instructions, or instructions, such that the machine readable instructions can be accessed by the processor 204. The machine readable instructions can comprise logic or algorithm(s) written in programming languages, and generations thereof, (e.g., 1GL, 2GL, 3GL, 4GL, or 5GL) such as, for example, machine language that may be directly executed by the processor 204, or assembly language, object-oriented programming (OOP) such as JAVA, Smalltalk, C++ or the like, conventional procedural programming languages, scripting languages, microcode, etc., that may be compiled or assembled into machine readable instructions and stored on the memory 206. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods and devices described herein may be implemented in any conventional computer programming language, as pre-programmed hardware elements, or as a combination of hardware and software components.

Note that when the processor 204 includes more than one processing device, the processing devices may be centrally located (e.g., directly coupled together via a wireline and/or wireless bus structure) or may be distributed located (e.g., cloud computing via indirect coupling via a local area network and/or a wide area network). Further note that when the processor 204 implements one or more of its functions via a state machine, analog circuitry, digital circuitry, and/or logic circuitry, the memory and/or memory element storing the corresponding operational instructions may be embedded within, or external to, the circuitry including the state machine, analog circuitry, digital circuitry, and/or logic circuitry.

Still further note that, the memory 206 stores, and the processor 204 executes, hard coded and/or operational instructions of modules corresponding to at least some of the steps and/or functions illustrated in FIGS. 1-6.

The vehicle control unit 110 can include one or more modules, at least some of which are described herein. The modules can be implemented as computer-readable program code that, when executed by a processor 204, implements one or more of the various processes described herein. One or more of the modules can be a component of the processor(s) 204, or one or more of the modules can be executed on and/or distributed among other processing systems to which the processor(s) 204 is operatively connected. The modules can include instructions (e.g., program logic) executable by one or more processor(s) 204.

The communication interface 202 generally governs and manages the data received via a vehicle network 212. There is no restriction on the present disclosure operating on any particular hardware arrangement and therefore the basic features herein may be substituted, removed, added to, or otherwise modified for improved hardware and/or firmware arrangements as they may develop.

As may be appreciated, the communication path 213 of the vehicle network 212 may be formed from a medium suitable for transmitting a signal such as, for example, conductive wires, conductive traces, optical waveguides, or the like. Moreover, the communication path 213 can be formed from a combination of mediums capable of transmitting signals. In one embodiment, the communication path 213 may include a combination of conductive traces, conductive wires, connectors, and buses that cooperate to permit the transmission of electrical data signals to components such as processors, memories, sensors, input devices, output devices, and communication devices.

Accordingly, the communication path 213 may be provided by a vehicle bus, or combinations thereof, such as for example, a Body Electronic Area Network (BEAN), a Controller Area Network (CAN) bus configuration, an Audio Visual Communication-Local Area Network (AVC-LAN) configuration, a Local Interconnect Network (LIN) configuration, a Vehicle Area Network (VAN) bus, and/or other combinations of additional communication-system architectures to provide communications between devices and systems of the vehicle 100. The term "signal" relates to a waveform (e.g., electrical, optical, magnetic, mechanical or electromagnetic), such as DC, AC, sinusoidal-wave, triangular-wave, square-wave, vibration, and the like, capable of traveling through at least some of the mediums described herein.

Respective modules of the vehicle control unit 110, and associated instructions, when executed by the processor 204, cause the processor 204 to retrieve point cloud data 216 from the object sensor devices 102, via the communication interface 202, and compare each of a set of pre-defined shape models with the point cloud data 216 on an iterative basis solving the set to a remaining one of the set of pre-defined shape models, as is discussed in detail with reference to FIGS. 3-6.

Figure 3:
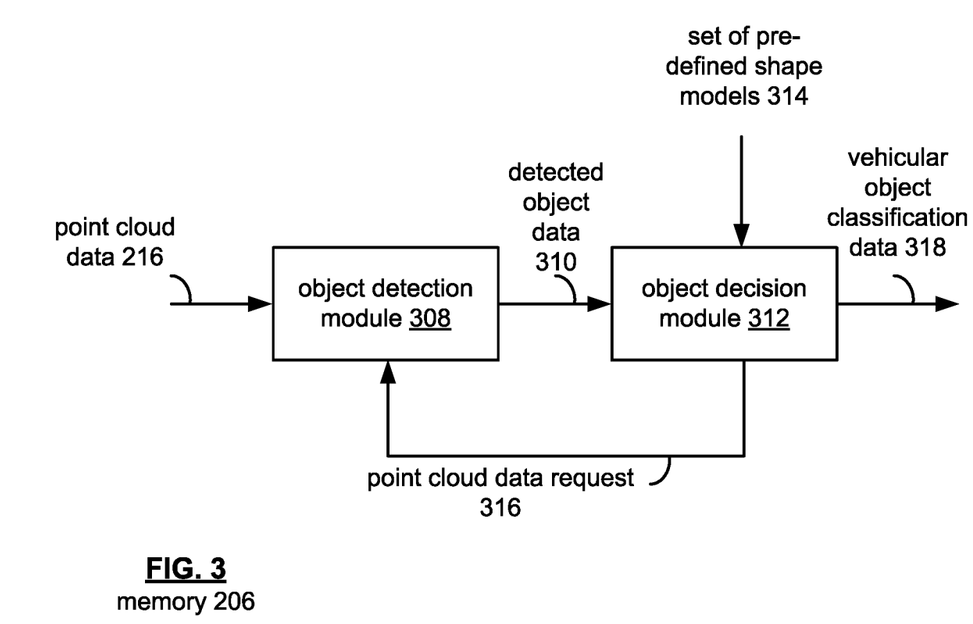
FIG. 3 illustrates a functional module block diagram stored in a memory for vehicle control unit 110.

FIG. 3 illustrates a functional module block diagram stored in a memory 206 for vehicle control unit 110, where memory 206 stores an object detection module 308, an object decision module 312, and an object tracking module 318.

The object detection module 308 includes instructions that, when executed by the processor, cause the processor to receive point cloud data 216 relating to at least a spatial portion of an environment of the vehicle, and detecting at least a portion of the object. The present examples may be directed to an object such as another vehicle (e.g., a passenger vehicle, a sport utility vehicle, a sport vehicle, a cargo vehicle, etc.).

As may be appreciated, the point cloud data 216 also includes points relating to the ground and/or terrestrial surfaces. Point cloud data 216 may include large quantities of point data for terrestrial surfaces. To aid in detecting at least a portion of an object from the point cloud data, terrestrial cloud points may be removed, such as by a pre-filtering of the point cloud data 216. An example of a pre-filter to remove terrestrial cloud points may include slope based filtering processes.

To further reduce the volume of point cloud data 216 for object detection, segmentation may be applied to the resulting pre-filtered cloud point data, such as scan line segmentation. As may be appreciated, scan line segmentation may consider each row of a scan line independently. Each scan line may form 3-dimensional line segments. As an example, a straight 3-dimensional line may be considered to come from points on a scan line. A triple of line segments may present a "seed region" that may satisfy the conditions of a minimum of line segments to detect at least a portion of an object from the point cloud data. Detected object data 310 may be provided to an object decision module 312, which receives a set of pre-defined shape models 314.

The object detection module 312 includes instructions that, when executed by the processor, cause the processor to compare each of the set of pre-defined shape models with the detected object data, and updating the set of pre-defined shape models to ones comparing favorably may operate by comparing each of the set of pre-defined shape models with the detected object data. When successive iterations of the point cloud data 216, based on a point cloud data request 316 to the object detection module 308, solves to a remaining one of the set of pre-defined shape models, the object detection module 312 includes instructions that, when executed by the processor, cause the processor to produce object classification data 318 based on the remaining one of the set of pre-defined shape models 314. As may be appreciated, object classification model 314 may include an axis-alignment corresponding to that of the object of the detected object data 310.

In this fashion, object detection and classification may be initiated earlier upon detecting at least a portion of an object. Successive iterations of the subsequent point cloud data, which may be based on closing distance with the object, may operate to solve to a remaining one of the set of pre-defined shape models. In this manner, object classification may be produced sooner, as compared to receiving point cloud data that may represent the entire object as a precondition to classification of the object.

Figure 4A:
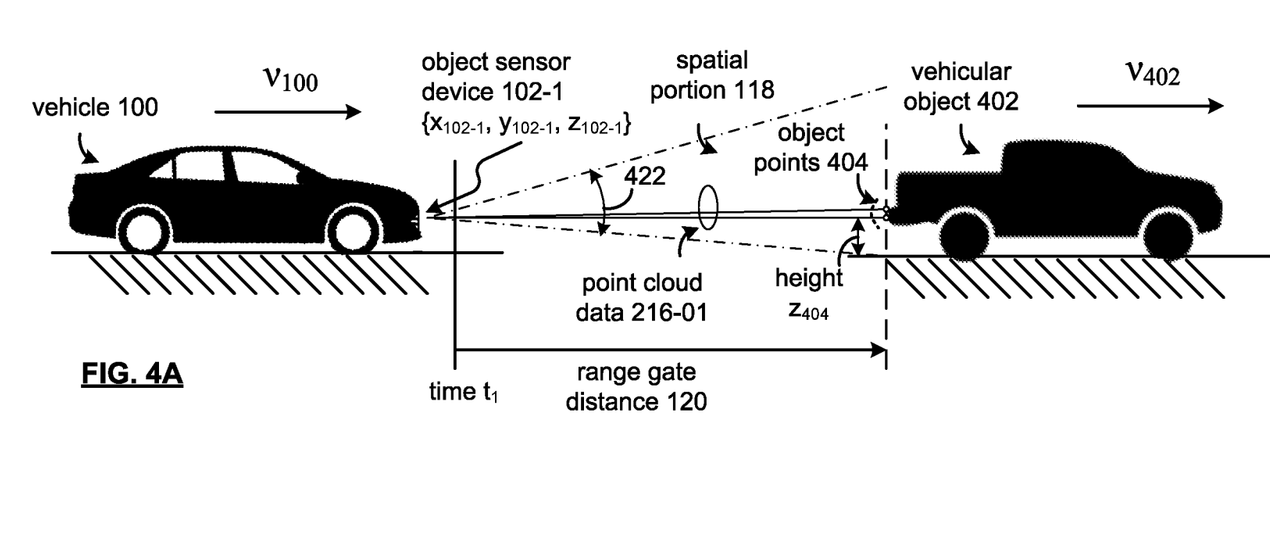
Figure 4B:
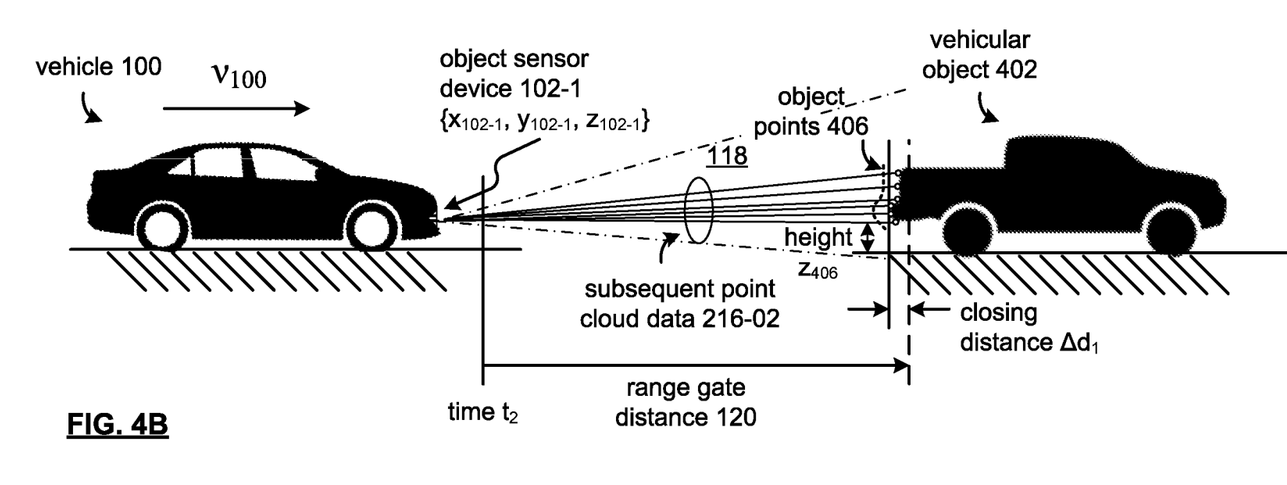

FIGS. 4A and 4B illustrate an operational example of an object sensor device 102-1 with respect to detecting at least a portion of a vehicular object 402.

For clarity, the example of FIGS. 4A and 4B are presented as two-dimensional figures, with the understanding that the method and device of the embodiments may be used in three-dimensional applications as well. Moreover, the spatial portion 118, which relates to a horizontal field-of-view (FIG. 1) and vertical field of view 422 of the object sensor device 102-1, is illustrated as generally linear and uniform for purposes of clarity, and that the range extends uniformly to a linear point with regard to an object. As may be appreciated, certain tolerances may affect the sounding signals that may generated by the object sensor devices 102 for return by a vehicular object 402, and the range may adopt a curved, non-linear boundary.

FIG. 4A illustrates an example in which a vehicular object 402 comes within a range gate distance 120 of the object sensor device 102-1. The range of the object sensor device 102-1 may be referred to as range gate distance 120. At a minimum value, for example, the range gate distance 120 may be limited by component specifications of the object sensor device 102-1.

At a maximum value, for example, the range gate distance 120 may be restricted by the characteristics of the emitted sounding signal and/or pulse. That is, the corresponding timing relationship of the emitted sounding signal with the returning signal at more rapid pulse rates may cause an inability to timely receive a returning signal. In other words, if a "time of flight" to an object exceeds a sound pulse repetition interval, a later return may interfere with a sounding pulse and generate signal distortion (such as echo ambiguity). As noted above, one-million point cloud points per second may be realized for a general range of about one-hundred-and-twenty meters for an object sensor device 102-1. As may be appreciated, range values for object sensor devices may increase over time.

The object sensor device 102-1 operates to generate object points 404 relating to a vehicular object 402. In the present example, the object points 404 provide point cloud data 216-01 relating to a surface of the object coming within the range gate distance 120. Such a surface may be portions of a vehicular object based on a rear view (such as a rear bumper profile, tailgate profile, rear fin profile, etc.), a side view (such as a side mirror profile, wheel well profile, side panel curve profile, etc.), a front view (such as a front bumper profile, a front grill profile, a front headlamp profile, etc.), and/or combinations thereof based on an angle of approach of the vehicle 100 to the vehicular object 402 (such as a rear profile/side profile transition surface as when the object 402 may be performing a turn).

For clarity of the present example, the vehicular object 402 may share a travel lane of the vehicle 100, with the object 402 positioned ahead of the vehicle 100. The velocity $V_{100}$ of the vehicle 100 may be such that the vehicle 100 may be closing a distance to the object 402 (that is, a relative velocity $V_{100}$ may be greater than a velocity $V_{402}$ of the vehicular object 402).

As the distance between the vehicle 100 and the object 402 closes, the object sensor device 102-1 may operate to generate object points 404 to at least a portion of the vehicular object 402 as the vehicular object 402 may enter range gate distance 120. In this respect, a rear profile of the vehicular 402 reveals a rear bumper portion with object points 404.

Though the point cloud data 216-01 may be visually depicted in the examples of FIGS. 4A and 4B, however, as one of ordinary skill may appreciate, object sensor device 102-1 in operation receives the object points 404, and converts the points 404 to data, which may be output as point cloud data 216-01 relating to a time $t_1$. The point cloud data 216-01, accordingly, provides detection of at least a portion of the vehicular object 402. Also, as may be appreciated, the object points 404 may appear separate from a ground surface by a height $Z_{404}$, which may be considered in a comparison of the portion of the vehicular object 402 of the point cloud data 2016-01 with each of a set of pre-defined shape models as discussed in detail with FIG. 5.

As may be appreciated, point cloud data 216-01 may pre-processed more efficiently detect objects by pre-filtering to remove terrestrial points and other data not related directly to the vehicular object 402, and may be segmented to accelerate detection processing of at least a portion of the vehicular object 402 from the cloud point data.

FIG. 4B illustrates an example in which a vehicular object 402 at a closing distance $\Delta d_1$ following an initial point cloud data 216-01 at an initial time $t_1$. As may be appreciated, the timing intervals and the distances may be exaggerated for clarity of the description. In operation, object sensor device 102-1 may generate one-million cloud points of point cloud data 216 relating to an environment 100, and the difference between sample periods may not be readily discernible without fast processing devices. Also, the sample periods and respective data may also be affected by object sensor devices 102 respective operational parameters, such as horizontal and veridical fields-of-view and range gate distances. The time intervals may be selected at an integer value (such as every 10, 20, 30, sample periods, etc.) to produce cloud point data samples with likely greater differences between them in order to yield vehicular object classification data based detected portions of the vehicular object 402.

As the distance between the vehicle 100 and the object 402 closes at a time $t_2$, the object sensor device 102-1 may operate to generate object points 406 for a comparatively larger portion of the vehicular object 402 in view of the closing distance $\Delta d_1$ covered from time $t_1$ to time $t_2$. In this example respect, a rear profile of the vehicular object 402 reveals a rear bumper portion with tailgate portion via object points 406. Object sensor device 102-1 in operation receives the object points 406, and converts the points 406 to data, which may be output as subsequent point cloud data 216-02 relating to a time $t_2$. That is, the subsequent point cloud data 216-02 relates to a time subsequent to initial detection about the range gate distance 120.

Figure 5:
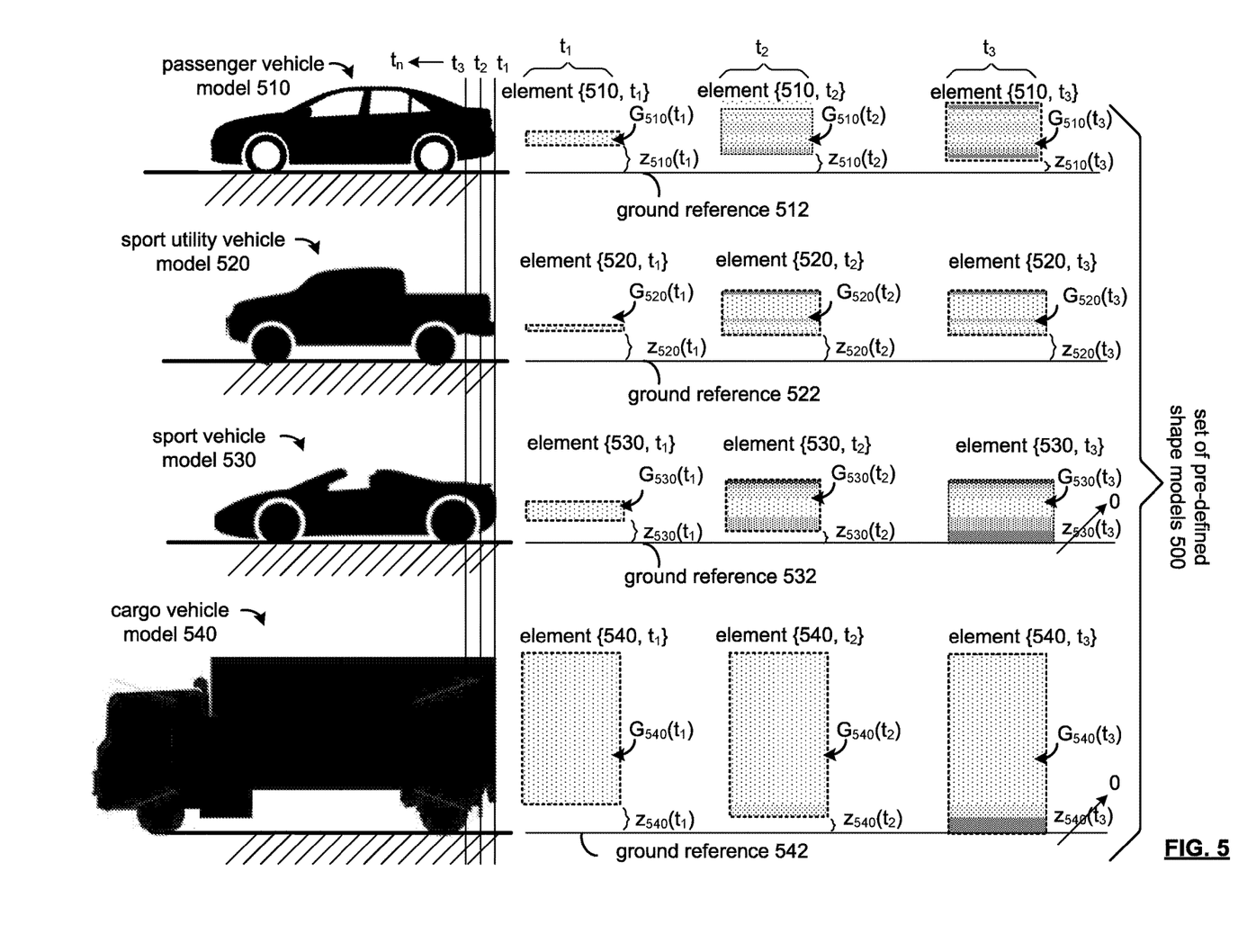
FIG. 5 illustrates a set of pre-defined shape models that may relate to objects of a vehicle environment for use in object identification.

The point cloud data 216-02, accordingly, provides detection of a greater portion of the vehicular object 402. Also, as may be appreciated, the object points 406 may appear separate from a ground surface by a height $Z_{404}$, which may be considered in a comparison of the portion of the vehicular object 402 of the point cloud data 2016-02 with each of a set of pre-defined shape models FIG. 5 illustrates a set of pre-defined shape models 500 that may relate to vehicular objects 402. For the example of FIG. 5, the set of pre-defined shape models 500 relate to rear profiles of different vehicle models, represented initially at an outer extent of a range gate distance 120 for a time $t_1$, and subsequent closing distance intervals $\Delta d$ for subsequent time intervals time $t_2$, $t_3$, etc.

As may be appreciated, the timing intervals and associated closing distances may be exaggerated in FIG. 5 for clarity of the description. An example set of vehicle models are shown, which may include a passenger vehicle model 510, a sport utility vehicle model 520, a sport vehicle model 530, and a cargo vehicle model 540. Additional vehicle models may be provided, including different profiles including left side, right side, front side profiles, as well as combinations thereof to provide comparisons with at least portions of a vehicular object 240.

Each of the vehicle models 510, 520, 530 and 540 includes a set of pre-defined shape models for respective reference times $t_1$, $t_2$, $t_3$, which may be extended through a desired time tn. Accordingly, passenger vehicle 510 may include set elements $\{510, t_1\}$, $\{510, t_2\}$, $\{510, t_3\}$ through $\{510, t_n\}$ with respect to ground reference 512; sport utility vehicle model 520 may include set elements $\{520, t_1\}$, $\{520, t_2\}$, $\{520, t_3\}$ through $\{520, t_n\}$ with respect to ground reference 522; sport vehicle model 530 may include set elements $\{530, t_1\}$, $\{510, t_2\}$, $\{510, t_3\}$ through $\{510, t_n\}$ with respect to ground reference 532; and cargo vehicle 540 may include set elements $\{540, t_1\}$, $\{540, t_2\}$, $\{540, t_3\}$ through $\{540, t_n\}$ with respect to ground reference 542.

The set elements of the example of FIG. 5 each provide a model at different sample times with a respective ground reference, and further may include respective point cloud gradients G relating to changing surface shapes of the respective vehicle models. Each element of the set of pre-defined shape models may include an area relating to a vehicular model profile. For example, each element may have a width dimension relating to aspects of the rear profile, and a height dimension of the portion of the rear profile being relatable to the vehicular model profile.

Also, each of the elements may include a distance Z dimension related to a respective ground reference. As may be appreciated, the area dimensions for each element may change as further point cloud data may be received. For example, the element $\{510, t_1\}$ of the passenger vehicle model 510 may reference a rear bumper area having a distance $Z_{510}(t_1)$ relative to ground reference 512. Element $\{510, t_3\}$ of passenger vehicle model 510 relates to a larger reflective surface with a pattern of gradients G that may operate to capture changes in the model surface respective times, such as at time $t_3$. As depicted, the distance $Z_{510}(t_3)$ is less than that of that of distance $Z_{510}(t_1)$.

In operation, an example method and process of the disclosure may extend an object identification range by determining an iterative match of one of the elements of the set of pre-defined shape models to an object by successive iterations of closing distance intervals $\Delta d$ of an object.

Referring briefly back to FIGS. 4A and 4B, an object sensor device 102-1 generates point cloud data 216-01 at a range gate distance 120 of the device 102-1. From the point cloud data 216-01, at least a portion of the vehicular object 402 may be detected. In the example of FIGS. 4A and 4B, the vehicular object 402 relates to a sport utility vehicle, and the portion detected relates to a rear bumper surface.

In FIG. 5, relating to an initial sample time $t_1$, each of a set of the pre-defined shape models 500, including passenger vehicle model 510, sport utility vehicle model 520, sport vehicle model 530, and cargo vehicle model 540. The generalized set of pre-defined models 500 may include further models that may include a model category (such as passenger vehicle, sport utility vehicle, sport vehicle, cargo vehicle, motorcycle, bicycle, side car, etc.) and also further forms of the category (such as semi-truck vehicle, four-door passenger vehicle, two-door passenger vehicle, mini-passenger vehicle, etc.), and further into models based on manufacturer. Accordingly, based on at least a portion of an object detected via received cloud point data of a range gate distance, successive iterations of cloud point data may be used to solve to an identification of a detected vehicular object, and/or object relating to a vehicle environment.

Comparisons may be made with respect to elements $\{510, t_1\}$, $\{520, t_1\}$, $\{530, t_1\}$, and $\{540, t_1\}$. The comparisons may include a respective gradient pattern $G_{510}(t_1)$, $G_{520}(t_1)$, $G_{530}(t_1)$, and $G_{540}(t_1)$, an area dimension of the respective element, and distance $Z_{510}(t_1)$ relative to respective ground references.

Processing would indicate models 510, 520 and 530 comparing favorably with regard to the detected portion of the vehicular model 402, but not with cargo vehicle model 540.

As may be appreciated, comparison decisions may be made on a binary logic basis (e.g., Boolean logic basing of true/false decisions), when applicable, and/or an infinite-value logic basis (e.g., a fuzzy logic based on truth values such as "strong comparison," "likely comparison," "unlikely comparison," etc.). Also, the comparison may take into consideration the quality and/or robustness of the point cloud data received. That is, point cloud data from a maximum limit of a range gate distance may be sporadic or less defined relative to point cloud data taken at later closing distance intervals, another iteration may operate to corroborate a comparison decision from point cloud data at a time $t_1$.

Accordingly, the set of pre-defined shape models 500 may be updated to include passenger vehicle model 510, sport utility vehicle model 520, and sport vehicle model 530. Cargo vehicle model 540 may be removed from the updated set.

Iterations relating to receiving, detecting, comparing may continue to solve to a remaining one of the set of pre-defined shape models, which for the example of FIG. 5 may include a passenger vehicle model 510, sport utility vehicle model 520, a sport vehicle model 530, a cargo vehicle model 540, etc.

For example, a subsequent iteration such as that illustrated by referring briefly back to the example of FIG. 4B, provides further cloud point data 216-02 relating to a time $t_2$. At least a portion of the object 402 may be detected from the point cloud data 216-02, and compared with each of the set, which has been updated, of pre-defined shape models 510, 520 and 530 via elements $\{510, t_2\}$, $\{520, t_2\}$, $\{530, t_2\}$, and associated gradient patterns and distances Z relative to a ground reference. For this example, the portion of the object detected may form a likely comparison with passenger vehicle model 510 and sport utility vehicle model 520 in view of these comparison parameters. Accordingly, the set of pre-defined shape models may be updated to include ones that compare favorably with the portion of the vehicular object 402 of the example of FIG. 4B.

Another subsequent iteration may provide further cloud point data 216-xx relating to a time $t_3$. At least a portion of the vehicular object 402 may be detected from the point cloud data 216-xx, and compared with each of the set, which has been updated, of pre-defined shape models 510, 520 and 530 via elements $\{510, t_3\}$, $\{520, t_3\}$, and associated gradient patterns and distances Z relative to a ground reference. For this example, the portion of the object detected may form a "likely comparison" with sport utility vehicle model 520 in view of these comparison parameters. Accordingly, when successive iterations solve to a singular remaining one of the set of pre-defined shape models, such as sport utility vehicle model 520, an iterative match to the vehicular object may be based on the remaining one of the set of pre-defined shape models (that is, sport utility vehicle model 520).

As may be appreciated, the set of pre-defined shape models 500 and related elements are provided for the purposes of example. As may be appreciated, additional models may be included, and additional elements relating to the pre-defined models 500 may be generated for further subsequent iterations to solve to a solution based on a pre-defined model of the set 500.

For example, models may include additional vehicular objects that may be present in a vehicle environment, such as motorcycles, motor scooters, bicycles, motor homes, trailers, etc. Also, models may include periphery objects to a vehicular environment, such as pedestrians, pets, children's toys (such as a ball crossing the roadway), etc.

Figure 6:
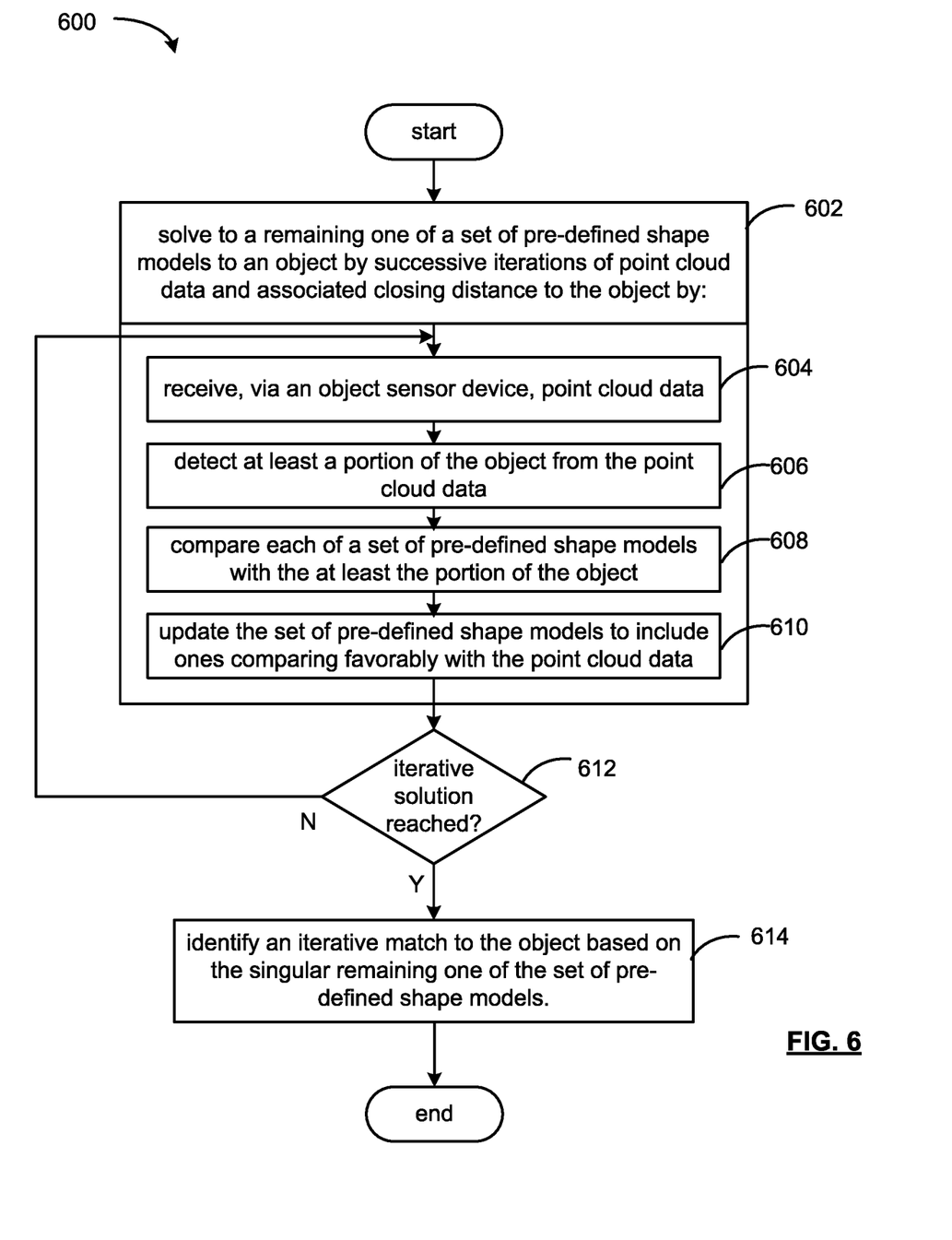
FIG. 6 is an example process for extending an object identification range in a vehicle environment for an object sensor device.

FIG. 6 is an example process 600 for extending an object identification range in a vehicle environment. The process 600 may include, at operation 602, solving to a remaining one of a set of pre-defined shape models to an object by successive iterations of point cloud data and associated closing distance to the object. The operation 602 may include a operation 604 of receiving point cloud data via an object sensor device, an operation 606 of detecting at least a portion of the object from the point cloud data, a operation 608 of comparing each of a set of pre-defined shape models with the at least the portion of the object, and a operation 610 of updating the set of pre-defined shape models to include ones comparing favorably with the point cloud data.

As may be appreciated, point cloud data may relate to a surface of the object coming within the range gate distance of the object sensor device. Such a surface may be portions of a vehicular object based on a rear view (such as a rear bumper profile, tailgate profile, rear fin profile, etc.), a side view (such as a side mirror profile, wheel well profile, side panel curve profile, etc.), a front view (such as a front bumper profile, a front grill profile, a front headlamp profile, etc.), and/or combinations thereof based on an angle of approach of a vehicle to an object (such as a rear profile/side profile transition surface as when the object may be performing a turn).

The set of pre-defined shape models may relate to objects of a vehicle environment, including vehicular objects. The set of pre-defined shape models may relate to elements based on cloud point profiles of different vehicle models, represented initially at an outer extent of a range gate distance at a time $t_1$, and subsequent closing distance intervals $\Delta d$ for subsequent time intervals time $t_2$, $t_3$, etc.

Pre-defined models may include passenger vehicles, sport utility vehicles, sport vehicles, cargo vehicles, motorcycles, bicycles, side cars, etc., and also sub-categories (such as semi-truck vehicle, four-door passenger vehicle, two-door passenger vehicle, mini-passenger vehicle, etc.), and manufacturers. Accordingly, based on at least a portion of an object detected via received cloud point data of operation 606, successive iterations of cloud point data of operation 612 may operate to solve to an identification of a detected vehicular object, and/or object relating to a vehicle environment at operation 614.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled."

As one of ordinary skill in the art will further appreciate, the term "compares favorably," as may be used herein, indicates that a comparison between two or more elements, items, signals, et cetera, provides a desired relationship.

As the term "module" is used in the description of the drawings, a module includes a functional block that is implemented in hardware, software, and/or firmware that performs one or more functions such as the processing of an input signal to produce an output signal. As used herein, a module may contain submodules that themselves are modules.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage medium, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

Thus, there has been described herein a device and method, as well as several embodiments, for extending object detection and identification capability for an object sensor device.

What is claimed is:

1. A method for extending an object identification range in a vehicle environment, the method comprising:
   solving to a remaining one of a set of pre-defined shape models for an object by successive iterations of point cloud data as a distance from a vehicle to the object along a travel lane decreases due to a velocity of the vehicle exceeding a velocity of the object by:
      receiving, via an object sensor device, the point cloud data;
      detecting at least a portion of the object from the point cloud data;
      comparing each of a set of pre-defined shape models with the at least the portion of the object; and
      updating the set of pre-defined shape models to include ones comparing favorably with the point cloud data; and
   when the successive iterations solve to a singular remaining one of the set of pre-defined shape models, identifying an iterative match to the object based on the singular remaining one of the set of pre-defined shape models.

2. The method of claim 1, further comprising:
   tracking the object based on the singular remaining one of the set of pre-defined shape models.

3. The method of claim 1, wherein the point cloud data is generated at a range gate distance characteristic of the object sensor device, the range gate distance characteristic producing a point cloud density relatable to the at least the portion of the object.

4. The method of claim 3, wherein the object sensor device comprises at least one of:
   a LIDAR object sensor device;
   a radar object sensor device; and
   a milliwave object sensor device.

5. The method of claim 1, wherein the point cloud data is generated at a range gate distance characteristic of the object sensor device.

6. The method of claim 1, wherein the set of pre-defined shape models comprises:
a vehicular model profile relatable to each of a plurality of point cloud data samples of a pre-defined three-dimensional vehicle based on a corresponding plurality of closing distances relative to a range gate distance characteristic of the object sensor device.

7. The method of claim 6, wherein the object sensor device has a known origin location with respect to the point cloud data of the object.

8. The method of claim 6, wherein the set of pre-defined shape models comprises at least one of:
a passenger vehicle model;
a sport utility vehicle model;
a sport vehicle model; and
a cargo vehicle model.

9. A method for object identification in a vehicle environment, the method comprising:
receiving, via an object sensor device, first point cloud data relating to at least a spatial portion of the vehicle environment, the first point cloud data being relatable to at least a portion of a vehicular object and a set of pre-defined shape models associated with the at least a spatial portion of the environment;
comparing each of the set of pre-defined shape models with the first point cloud data;
forming a first subset of pre-defined shape models based on remaining ones of the set of pre-defined shape models comparing favorably with the first point cloud; and
determining most-likely match of the set of pre-defined shape models by iteratively, as a distance between a vehicle and the vehicular object along a travel lane decreases due to a velocity of the vehicle exceeding a velocity of the vehicular object:
receiving subsequent point cloud data relating to at least a further portion of the vehicular object;
comparing each of a remaining ones of the first subset of pre-defined shape models with the subsequent point cloud data; and
updating the remaining ones of the first subset of pre-defined shape models; and
when the first subset of pre-defined shape models corresponds to a remaining one of the first subset of pre-defined shape models, identifying a most-likely match of the vehicular object with the remaining one of the first subset of pre-defined shape models.

10. The method of claim 9, wherein the first point cloud data is generated at a range gate distance characteristic of the object sensor device, the range gate distance characteristic producing a point cloud density relatable to the at least the portion of the vehicular object.

11. The method of claim 10, wherein the object sensor device comprises at least one of:
a LIDAR object sensor device;
a radar object sensor device; and
a milliwave object sensor device.

12. The method of claim 9, wherein the first point cloud data is generated at a range gate distance characteristic of the object sensor device.

13. The method of claim 9, wherein the set of pre-defined shape models comprises:
a vehicular model profile relatable to each of a plurality of point cloud data samples of a known three-dimensional vehicle based on a corresponding plurality of sample distances up to a range gate distance characteristic of the object sensor device.

14. The method of claim 13, wherein the object sensor device has a known origin location with respect to the each of the plurality of point cloud data samples of the known three-dimensional vehicle.

15. The method of claim 13, wherein the set of pre-defined shape models comprise at least one of:
a passenger vehicle model;
a sport utility vehicle model;
a sport vehicle model; and
a cargo vehicle model.

16. A vehicle control unit for vehicular object identification in a vehicle environment, the vehicle control unit comprising:
a processor;
memory communicably coupled to the processor and to an object sensor device, and the memory storing:
an object detection module including instructions that, when executed by the processor, cause the processor to:
receive, via an object sensor device, point cloud data;
detect at least a portion of a vehicular object from the point cloud data; and
produce detected vehicular object data from the at least the portion of the vehicular object from the point cloud data; and
an object decision module including instructions that, when executed by the processor, cause the processor to:
compare each of a set of pre-defined shape models with the detected vehicular object data; and
update the set of pre-defined shape models to ones comparing favorably with the detected vehicular object data; and
wherein, when successive iterations of the object detection module and the object decision module on subsequent point cloud data, as a distance from a vehicle to the vehicular object along a travel lane decreases due to a velocity of the vehicle exceeding a velocity of the vehicular object, solve to a remaining one of the set of pre-defined shape models, the object decision module produces vehicular object classification data based on the remaining one of the set of pre-defined shape models.

17. The vehicle control unit of claim 16, wherein the point cloud data is generated at a range gate distance characteristic of the object sensor device, the range gate distance characteristic producing a point cloud density relatable to the at least the portion of the object.

18. The vehicle control unit of claim 16, wherein the point cloud data is generated at a range gate distance characteristic of the object sensor device.

19. The vehicle control unit of claim 18, wherein the object sensor device has a predetermined origin location with respect to the each of the plurality of point cloud data samples of each of the set of pre-defined shape models.

20. The vehicle control unit of claim 16, wherein the set of pre-defined shape models comprises at least one of:
a passenger vehicle model;
a sport utility vehicle model;
a sport vehicle model; and
a cargo vehicle model.

* * * * *